United States Patent [19]
Chock

[11] Patent Number: 5,267,753
[45] Date of Patent: Dec. 7, 1993

[54] HOLOGRAPHIC BANK DRAFT

[76] Inventor: Ernest Chock, 1048 24th St., Santa Monica, Calif. 90403-4528

[21] Appl. No.: 856,755

[22] Filed: Mar. 24, 1992

Related U.S. Application Data

[63] Continuation-in-part of Ser. No. 726,901, Jul. 8, 1991.

[51] Int. Cl.$^5$ .............................................. B42D 15/00
[52] U.S. Cl. ........................................ 283/58; 283/86; 359/2
[58] Field of Search ..................... 283/86–91, 283/904, 58; 359/2

[56] References Cited

U.S. PATENT DOCUMENTS

| | | | |
|---|---|---|---|
| 4,014,602 | 3/1977 | Ruell | 359/2 |
| 4,611,826 | 9/1986 | Breen | 283/58 X |
| 4,634,148 | 1/1987 | Greene | 283/58 X |
| 5,145,212 | 9/1992 | Mallik | 283/86 |

Primary Examiner—Timothy V. Eley
Assistant Examiner—Willmon Fridie, Jr.
Attorney, Agent, or Firm—Donald G. Lewis

[57] ABSTRACT

A bank draft form may incorporate a hologram as an anti-counterfeit measure. The hologram may extend over a substantial portion of the bank draft form, including the signature entry area and other data entry areas of the form, e.g. the date, payee, and amount areas. The hologram includes an outer layer of a transparent layer of ink compatible material over such areas. The transparent layer of ink compatible material allows the drawer to affix his or her signature within the signature entry area and to enter the various terms of the draft, e.g. the date, amount, payee etc. Writing upon the ink compatible surface of the hologram partially occults the hologram underneath such writing and may cause the embossed surface of the hologram to become etched. The partial effacing of the hologram increases the difficulty of its duplication by a counterfeiter. If the hologram extends over portions of the bank draft form other than the signature entry area and the data entry areas, selected portions of the hologram outside such areas may have a transparent layer of ink incompatible material. A transparent layer of ink incompatible material may serve to protect such areas of the hologram from finger prints, accidental marking, etching, and the like. Optionally, after the holographic bank draft form is completed and executed, the holographic portion may then be covered with a protective laminate so as to prevent its alteration.

20 Claims, 1 Drawing Sheet

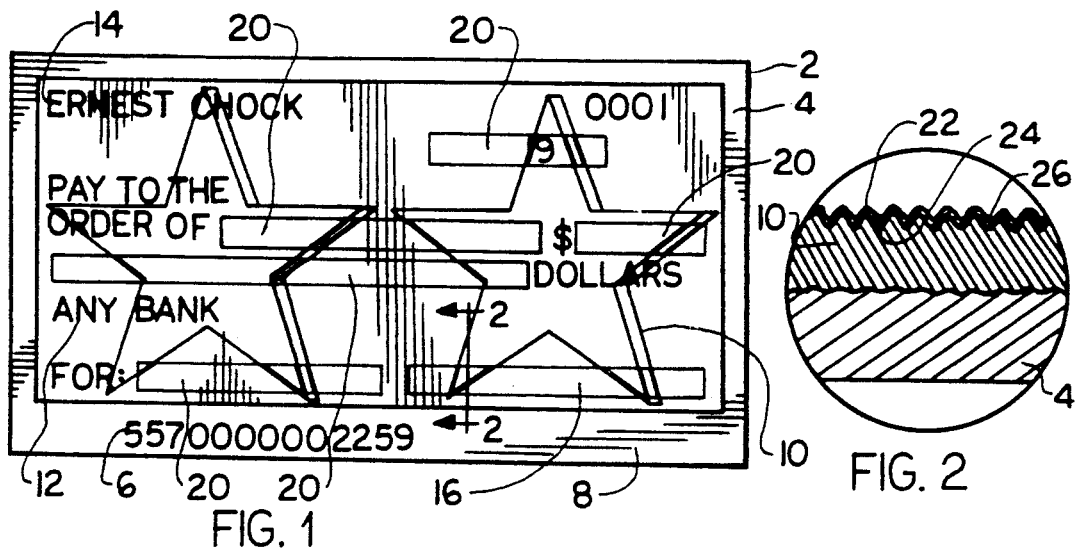
FIG. 1
FIG. 2
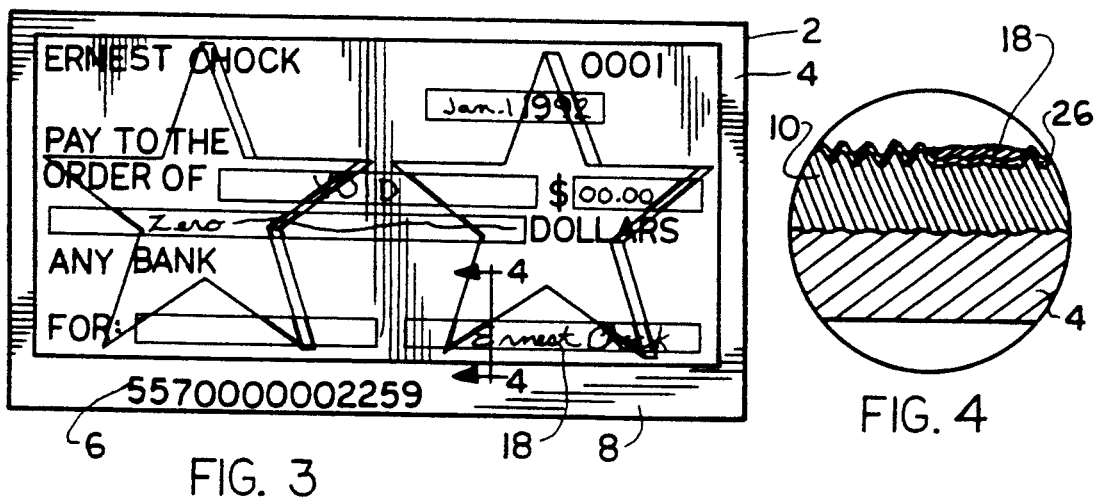
FIG. 3
FIG. 4
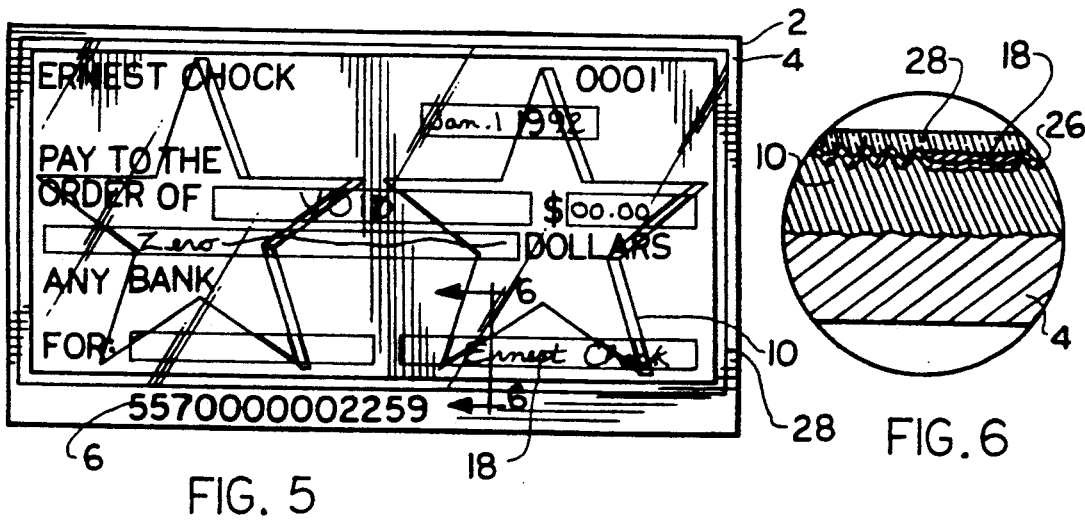
FIG. 5
FIG. 6

HOLOGRAPHIC BANK DRAFT

This is a continuation-in-part of copending application Ser. No. 07/726,901 filed on Jul. 8, 1991.

BACKGROUND

The invention relates to methods for discouraging the counterfeiting of bank drafts. More particularly, the invention relates to the use of holograms with bank drafts for discouraging the counterfeiting of same.

The banking industry is engaged in an arms race with forgers to discourage the use of counterfeit bank draft forms in connection with the crime of forging checks. The ability of forgers to duplicate blank bank draft forms and other security documents has been greatly enhanced by the advent of the new generation of high resolution color graphic desktop publishing systems and duplicating machines. Holograms have now been introduced as an anti-counterfeit measure and are incorporated into many security documents and devices so as to increase the difficulty of their duplication.

A method for mass producing holograms for use with security documents and devices has been disclosed by Dennison (WO 8903760, incorporated herein by reference). Dennison discloses a thermoplastic coating of metallized paper and/or heat-resistant plastic substrates which may be employed for embossing holographic patterns onto such substrates at high speed. If it is desired to print non-holographic information or art work atop the holographic pattern, the hologram may be covered with a coating of ink compatible primer. However, after such printing is complete and before such holograms are released to the public, the holograms are conventionally coated with a laminated covering of ink incompatible material so as to protect the integrity of the holographic image during handling and so as to deter its duplication.

SUMMARY

The invention is a holographic bank draft form. In its most elementary embodiment, the holographic bank draft form is similar to a conventional bank draft form except that all or a substantial portion of the front face of the bank draft, including the signature entry area, comprises a hologram. The hologram includes a transparent layer of ink compatible material for writing or marking ink images thereon. Affixing the drawer's signature onto the hologram serves to partially occult the holographic image. If the hologram is embossed, affixing a signature and/or one or more terms thereonto may also serve to etch the embossing of the hologram, thereby further defacing its holographic image. The occultation and/or etching of a holographic pattern largely neutralizes the utility of its reproduction by counterfeiters. The holographic signature panel of the bank draft provides an enhanced degree of assurance with respect to the genuineness of the signature and/or with respect to the authenticity of the security document or device onto which the holographic signature panel is incorporated.

In an other embodiment, a smaller hologram may be employed to cover the signature entry area only or several such holograms may be employed to cover several areas of the bank draft form. In either event, the hologram(s) of this embodiment cover both the signature entry area and/or various other data entry areas, e.g. areas for entering the date, name of the payee, amount of the bank draft, etc. In this embodiment, the signature entry area and the various data entry areas are coated with a transparent layer of ink compatible material. In a variation of this embodiment and/or of the first embodiment, the remainder of the hologram may be coated with a transparent layer of ink incompatible material so as to preserve its integrity during handling.

BRIEF DESCRIPTION OF THE DRAWINGS

FIG. 1 is a plan view of an unsigned holographic bank draft form having a single large hologram encompassing both the signature entry area and the date entry areas, the signature entry area and the date entry areas having a transparent layer of ink compatible material.

FIG. 2 is an enlarged sectional view of the unsigned holographic bank draft of FIG. 1, illustrating intact holographic embossing.

FIG. 3 is a view of a holographic bank draft form onto which the drawer's signature has been affixed and onto which the terms of the bank draft have been entered.

FIG. 4 is an enlarged sectional view of the holographic bank draft form of FIG. 3, illustrating holographic embossing which has been partially destroyed by a signature.

FIG. 5 is a plan view of a completed bank draft form with a protective lamination thereover.

FIG. 6 is an enlarged sectional view of the completed holographic bank draft of FIG. 5 illustrating a transparent protective layer covering the signature.

DETAILED DESCRIPTION

A preferred embodiment of the holographic bank draft form (2) and a preferred method for using same are illustrated in FIGS. 1-6. In the preferred embodiment, the holographic bank draft form (2) includes a substrate (4) of paper or other paper like materials conventionally employed for supporting holograms. The substrate (4) may include printed material such as the bank identification numbers (6) on the bottom margin (8) of the bank draft form (2). Overlaying part or all of the substrate (4) is a hologram (10). If bank identification numbers (6) or other items are printed on the substrate (4), then it is preferred that the hologram (10) not be overlaid over such printed areas of the substrate (4).

The hologram (10) is then be bonded or otherwise attached to the substrate (4) by conventional methods described below. Those items necessary to make a convention bank draft form (2) which are not printed onto the substrate (4) can be printed or otherwise incorporated onto the hologram (10). For example, the name and address of the bank (12) and of the drawer (14) and the executory language of the bank draft form (2) may be printed either onto the substrate (4) or incorporated into the hologram (10). In a preferred embodiment, the signature entry area (16) for the drawer's signature (18) and the various data entry areas (20) of the bank draft form (2), e.g. the area for entering the date, the name of the payee, and the amount of the bank draft, are all incorporated into the hologram (10). Such items may be printed directly onto the hologram (10). Such printing overlays the hologram (10) and partially occults the holographic image. Alternatively, such items may be incorporated directly into the holographic image.

There are two types of preferred holograms (10). The first type has a reflective surface (8) embossed or otherwise formed with a pattern of ridges (22) and troughs (24) within the submicrometer range for forming a conventional holographic pattern, Dennison discloses that metallized paper and other substrates (4) having a layer of thermoplastic coating can be embossed at high speed. Other conventional methods for embossing, electroplating, etching, etc. are well known and may be employed for forming holograms (10) of this first type, i.e. of the type which has a pattern of ridges (22) and troughs (24).

The second type of preferred hologram (10) employs a photosensitive polymeric layer having an alternating pattern of dark and bright contrasting lines within the submicrometer range for forming the holographic image.

If the surface of the hologram (10) is incompatible with the application of ink, then an ink compatible layer (26) or primer may be applied as a thin coating over the entire hologram (10). In an alternative embodiment, the ink compatible layer (26) is applied to only those areas onto which data must be entered or signatures (18) must be affixed. Alternatively, the coating of ink compatible material (26) over the hologram (10) may take other patterns. The ink compatible layer (26) should preferably be transparent. Polyacetate may serve as a preferred composition of the ink compatible layer (26).

Once the hologram (10) has been overlaid onto the substrate (4) and the hologram (10) has been coated or partially coated with a thin layer of ink compatible layer (26), an executed holographic bank draft (2) may then be formed from the blank holographic bank draft form (2) by entering the appropriate data into the data entry areas (20) (i.e. the date, payee, amount, etc.) and then affixing the drawer's signature (18) onto the signature entry area (16) of the hologram (10), as illustrated in FIGS. 3 and 4. In the preferred mode, affixation of the drawer's signature(s) (18) should be done with an ink writing instrument, e.g. a pen. Entry of the terms of the bank draft and other data may be made by ink writing instruments, by type writers, printers etc. If the hologram (10) is of the type made of the photosensitive polymeric layer, then the affixation of the signature (18) serves to partially deface the holographic image by blocking or occulting that portion of the hologram (10) over which the signature (18) is affixed. On the other hand, if the hologram (10) is of the type which includes a pattern of ridges (22) and troughs (24), then the affixation of the signature (18) serves to partially deface the holographic image both by etching the signature (18) onto the embossed holographic pattern and by partially blocking or occulting that portion of the hologram (10) over which the signature (18) is affixed.

FIGS. 5 and 6 illustrate a preferred embodiment of the holographic bank draft (2) which includes a protective laminate (28) for covering the signature (18) and for preventing or deterring its alteration or removal. A preferred protective laminate (28) has a composition of mylar and may cover not only the signature (18) but also the hologram (10) and the entire substrate (4) which supports the hologram (10). The protective laminate (28) should transparent. Conventional transparent adhesive tape applied to the hologram (10) may also be employed as a protective laminate (28).

The transparent layer of ink incompatible material serves to protect the hologram (10) from finger prints, accidental marking, etching, and the like. Optionally, after the holographic bank draft form (2) is completed and executed, the holographic portion may then be covered with a protective laminate (28) so as to prevent its alteration.

In an alternative embodiment, the holographic bank draft form (2) comprises a substrate (4) and a holographic sticker panel (10), i.e. a tamper-proof adhesive-backed holographic panel (10). The holographic bank draft form (2) is assembled by the user or the user's agent by applying the holographic sticker panel (10) to the substrate directly prior to use. The holographic sticker panel (10) may include one or more signature entry areas (16) and/or data entry areas (20). In a preferred mode, the signature entry area and/or data entry areas of holographic sticker panel (10) are filled in by the user after its attachment to the substrate (4). However, in some instances, it may be possible for the user to fill-in the signature and/or date entry areas of the holographic sticker panel (10) prior to its transfer onto the substrate (4). A preferred tamper-proof adhesive-backed holographic panel (10) includes a checkered adhesive backing. Once the holographic panel (10) is attached to the substrate (4), any attempt to peel the holographic panel (10) therefrom causes the holographic image to become distorted or destroyed due to the uneven attachment of the checkered adhesive backing to the substrate (4). Tamper-proof adhesive-backed holographic panels (10) having checkered adhesive backing are marketed by Crown Rolleaf (Patterson, N.J.) and by Flexcon, Inc. (Spencer, Mass.). As an additional feature, the tamper-proof adhesive-backed holographic panels (10) may be printed with serial numbers. The serial numbers may be logged on a separate registry maintained by the bank. If the bank draft form (2) is lost or stolen, the absence of a valid serial number on the holographic sticker panel (10) may be ascertained by a bank by comparing the submitted serial number with the bank's registry of valid serial numbers. The failure of a submitted serial number to correlate with a valid serial number logged onto the bank's registry, may alert the bank to the possibility that a submitted draft is invalid.

What is claimed is:

1. In an improved form for a bank draft, the form including:
    a data entry area for entering and displaying one or more terms of the bank draft,
    a signature entry area for affixing and displaying a signature of a drawer of the bank draft, the improvement comprising:
    a hologram extending over said signature entry area for forming a holographic image thereupon, said hologram being coated with a transparent layer of ink compatible material suitable for affixing the signature of the drawer thereonto and suitable for displaying the signature of the drawer over the holographic image.

2. An improved form of a bank draft as described in claim 1, the improvement further comprising:
    said hologram also extending over said data entry area for forming a holographic image thereupon, said hologram being coated with a transparent layer of ink compatible material within said data entry area suitable for entering one or more terms of the bank draft and suitable for displaying the terms of the bank draft over the holographic image.

3. An improved form of a bank draft as described in claim 1, wherein said transparent ink compatible layer having a polyacetate composition.

4. An improved form of a bank draft as described in claim 1, wherein said hologram being a holographic sticker panel.

5. An improved form of a bank draft as described in claim 4, wherein said holographic sticker panel having a tamper-proof adhesive backing.

6. A form for a bank draft, the form comprising:
   a substrate,
   a hologram supported by said substrate, said hologram having an embossed holographic pattern for forming a holographic image,
   a data entry area on said hologram for entering and displaying one or more terms of the bank draft,
   a signature entry area on said hologram for affixing and displaying a signature of a drawer of the bank draft,
   both said data entry area and said signature entry area of said hologram being coated with a transparent layer of ink compatible material suitable for entering the signature of the drawer and one or more of the terms of the bank draft thereonto and for displaying the signature of the drawer and one or more of the terms of the bank draft over the holographic image of the hologram.

7. A form for a bank draft as described in claim 6 further comprising:
   a signature affixed to said transparent layer of ink compatible material on said hologram, said signature serving to partially occult said hologram.

8. A form for a bank draft as described in claim 7 further comprising:
   a transparent protective laminate for covering said signature and said hologram for hindering the alteration thereof.

9. A form for a bank draft as described in claim 7 wherein said transparent ink compatible layer having a polyacetate composition and said transparent protective laminate has a composition of mylar.

10. A form for a bank draft as described in claim 7 wherein
    said hologram being formed from an embossed metallic foil.

11. A form for a bank draft as described in claim 7 wherein
    said hologram being formed from a photosensitized polymeric layer having a submicrometer holographic pattern of dark and bright contrasting lines for forming a holographic image.

12. A form for a bank draft as described in claim 7, wherein said hologram being a holographic sticker panel.

13. A form for a bank draft as described in claim 12, wherein said holographic sticker panel having a tamper-proof adhesive backing.

14. A method for making a holographic bank draft, the method comprising the following steps:
    Step A: producing a holographic bank draft form having a holographic image; then
    Step B: entering a set of terms onto the holographic bank draft form; and
    Step C: affixing a drawer's signature upon an ink compatible layer of the holographic bank draft form for partially occulting the holographic image of the holographic bank draft form.

15. A method for making a holographic bank draft as described in claim 12 comprising the following further step:
    in said Step B: the set of terms being entered onto an ink compatible layer of the holographic bank draft form for partially occulting the holographic image of the holographic bank draft form.

16. A method for making a holographic bank draft as described in claim 12 comprising the following further step:
    step D: after said Step C, covering the signature with a transparent protective laminate for preventing the alteration thereof.

17. A method for making a holographic bank draft as described in claim 12 wherein:
    in said Step A: the holographic bank draft form being produced with a hologram having an embossed metallic foil for forming the holographic image.

18. A method for making a holographic bank draft as described in claim 12 wherein:
    in said Step A: the holographic bank draft form being produced with a hologram having a photosensitized polymer with a pattern of dark and light contrasting lines for forming the holographic image.

19. A method for making a holographic bank draft as described in claim 12 wherein:
    in said Step A, the holographic image being incorporated into a holographic sticker panel, the holographic sticker panel being applied to a substrate for forming the holographic bank draft.

20. A method for making a holographic bank draft as described in claim 19 wherein:
    in said Step A, holographic sticker panel having a tamper-proof adhesive backing.

* * * * *